United States Patent
Yamamoto et al.

(10) Patent No.: US 6,688,772 B2
(45) Date of Patent: Feb. 10, 2004

(54) RETAINER FOR BALL BEARING, AND BALL BEARING INCLUDING THE SAME

(75) Inventors: Takuya Yamamoto, Miyota-machi (JP); Shigenori Hoya, Miyota-machi (JP)

(73) Assignee: Minebea Kabushiki-Kaisha, Nagano-ken (JP)

( * ) Notice: Subject to any disclaimer, the term of this patent is extended or adjusted under 35 U.S.C. 154(b) by 0 days.

(21) Appl. No.: 10/188,084

(22) Filed: Jul. 3, 2002

(65) Prior Publication Data

US 2003/0012471 A1 Jan. 16, 2003

(30) Foreign Application Priority Data

Jul. 12, 2001 (JP) .......................................... 2001-212383

(51) Int. Cl.[7] .............................................. F16C 33/41
(52) U.S. Cl. ........................................................ 384/531
(58) Field of Search ................................ 384/531, 532, 384/534, 526, 523

(56) References Cited

U.S. PATENT DOCUMENTS 1,352,110 A * 9/1920 Brakenhielm ............... 384/526
6,276,836 B1 * 8/2001 Suzuki et al. ............... 384/531

\* cited by examiner

*Primary Examiner*—Lenard A Footland
(74) *Attorney, Agent, or Firm*—Israel Gopstein

(57) ABSTRACT

A retainer for a ball bearing being characterized in that each pocket includes upper halves following the entrance, a pair of lower halves following the upper halves, and a bottom portion disposed between lower halves, wherein an inner peripheral surface of each upper half presents a curved surface of a radius of curvature slightly larger than that of the ball to be retained therein in both peripheral and width directions of the pocket, an inner peripheral surface of each lower half descending inwardly, the inner peripheral surface of each lower half and an inner surface of the bottom portion each presents a configuration which has a shape of curved surface in the width direction of the pocket and of a straight shape in the peripheral direction of the pocket so as to contact tangentially with the ball so as to contact tangentially with the ball to be retained.

10 Claims, 5 Drawing Sheets

RETAINER FOR BALL BEARING, AND BALL BEARING INCLUDING THE SAME

BACKGROUND OF THE INVENTION

1. Technical Field

The present invention relates to a ball retainer suitable especially for the bearing of the rotating portion of so-called office automation equipment (OA equipment), and a ball bearing including the same.

2. Description of the Prior Art

The ball bearing includes a retainer for disposing balls at the appropriate position between inner and outer rings thereof.

In the crown shaped retainer of the prior art as shown in FIG. 8, a plurality of pockets 22 for retaining balls are provided circumferentially at equal intervals around an annular body 21.

Each pocket includes an entrance 23 defined by a pair of opposite claws 24, 24.

The inner peripheral surface of the pocket has a spherical shaped inner peripheral surface corresponding substantially to the surface of the ball to be retained therein.

In the retainer of the prior art of the above-mentioned type, the thickness d of the body is enlarged to increase the strength and the rigidity thereof. Thus the surface area of the inner periphery of the pocket is increased so that the frictional resistance to be exerted on the ball through the contact with the inner peripheral surface of the pocket is also increased.

The frictional resistance will also be increased by the fact that the shape of the spherical shaped inner peripheral surface of the pocket is similar to the surface of the ball.

OBJECT OF THE INVENTION

The object of the present invention is to reduce the size of the pockets of the ball bearing without lowering the rigidity of the retainer through the reduction of the contact area between a ball and a retainer.

Another object of the present invention is to provide a substantially triangular shaped lubricant reservoirs between the ball and a junction between the upper and lower half of the pocket, and a junction between the lower half and the bottom portion of the pocket.

SUMMARY OF THE INVENTION

In order to attain the object of the present invention, in accordance with the first aspect of the present invention, a retainer includes an annular retainer body, a plurality of pockets for retaining the balls therein disposed around the retainer body, and a ball entrance of each pocket defined by a pair of opposite slightly elastic claws formed on one of the outer edges of the retainer body, the retainer being characterized in that each pocket includes substantially upper left and right halves following the entrance, a pair of right and left lower halves following the upper halves, and a bottom portion disposed between lower halves, wherein, an inner peripheral surface of each upper half presents a curved surface of the pocket of the radius of curvature slightly larger than that of the ball to be retained therein in both peripheral and width directions, an inner peripheral surface of each lower half descending inwardly toward the junction with the bottom portion of the pocket presents a configuration which has a shape of curved surface in the width direction of the pocket and of a straight shape in the peripheral direction of the pocket so as to contact tangentially with the ball, and an inner surface of the bottom presents a configuration which has a shape of curved surface in the width direction in the same way as those of the upper and lower halves, and is straight shape in the peripheral direction of the pocket so as to contact tangentially with the ball to be retained.

The retainer for a ball bearing according to the present invention is further characterized in that the thickness of a portion of the retainer around the pocket is reduced, and the thickness of a portion of the retainer other than the portion around the pocket is enlarged, said claws have an elasticity sufficient to allow the ball to push them apart to get into the pocket, and said retainer is made of synthetic resin.

In accordance with the second aspect of the present invention, a ball bearing including a retainer, plurality of balls an inner ring and an outer ring, the retainer includes an annular retainer body, a plurality of pockets for retaining the balls therein disposed around the retainer body, and a ball entrance of each pocket defined by a pair of opposite slightly elastic claws formed on one of the outer edges of the retainer body, the retainer being characterized in that each pocket includes substantially upper left and right halves following the entrance, a pair of right and left lower halves following the upper halves, and a bottom portion disposed between lower halves, wherein, an inner peripheral surface of each upper half presents a curved surface of the pocket of the radius of curvature slightly larger than that of the ball to be retained therein in both peripheral and width directions, an inner peripheral surface of each lower half descending inwardly toward the junction with the bottom portion of the pocket presents a configuration which has a shape of curved surface in the width direction of the pocket and of a straight shape in the peripheral direction of the pocket so as to contact tangentially with the ball, an inner surface of the bottom presents a configuration which has a shape of curved surface in the width direction in the same way as those of the upper and lower halves, and is straight shape in the peripheral direction of the pocket so as to contact tangentially with the ball to be retained, and the retainer is assembled between the inner ring and the outer ring and the balls are retained within the pockets.

The ball bearing according to the present invention is further characterized in that the thickness of a portion of the retainer around the pocket is reduced, and the thickness of a portion of the retainer other than the portion around the pocket is enlarged, said claws have an elasticity sufficient to allow the ball to push them apart to get into the pocket, said retainer is made of synthetic resin, and lubricant reservoirs of substantially triangular configuration are defined between the ball and a junction between the upper and lower half of the pocket, and a junction between the lower half and the bottom portion of the pocket.

BRIEF DESCRIPTION OF THE DRAWINGS

Further feature of the present invention will become apparent to those skilled in the art to which the present invention relates from reading the following specification with reference to the accompanying drawings, in which.

DETAILED DESCRIPTION ON THE PRESENT INVENTION

An embodiment of a retainer of the present invention and a ball bearing employing the same will now be described in detail.

Figure 1:
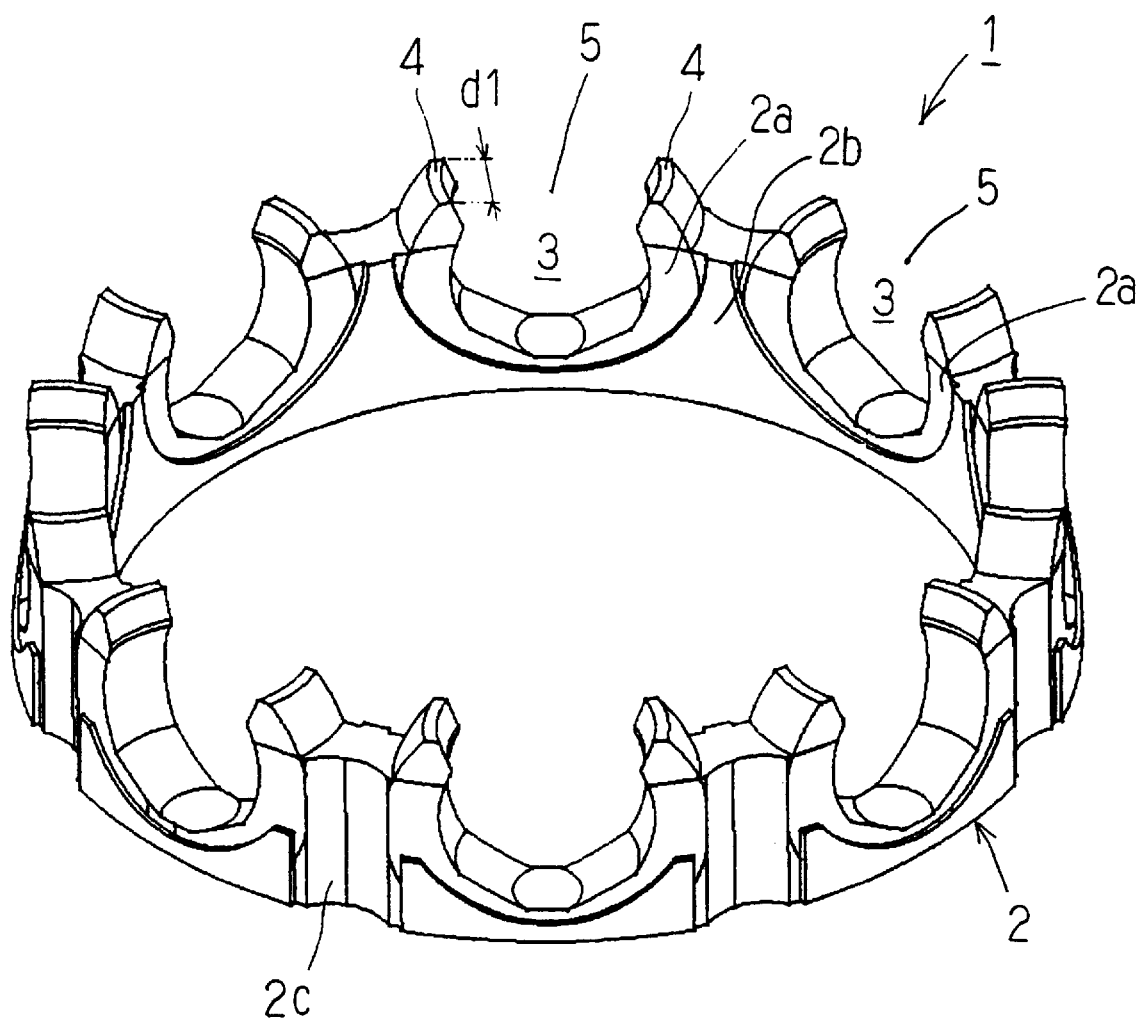
FIG. 1 is a perspective view showing the general structure of the retainer of the present invention.

As shown in FIG. 1, the reference numeral 1 represents the retainer of the present invention and the reference numeral 2 represents a body of the retainer. The body has an annular shape and is made of synthetic resin.

Figure 2:
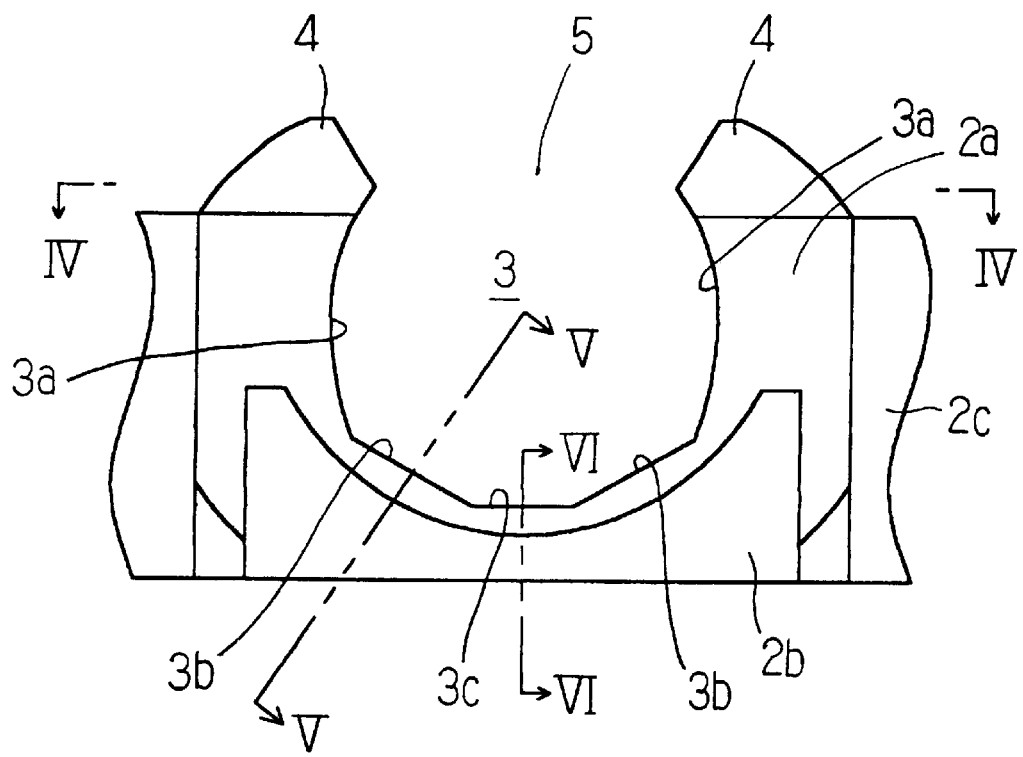
FIG. 2 is an enlarged elevational view showing the pocket portion of the retainer.
Figure 3:
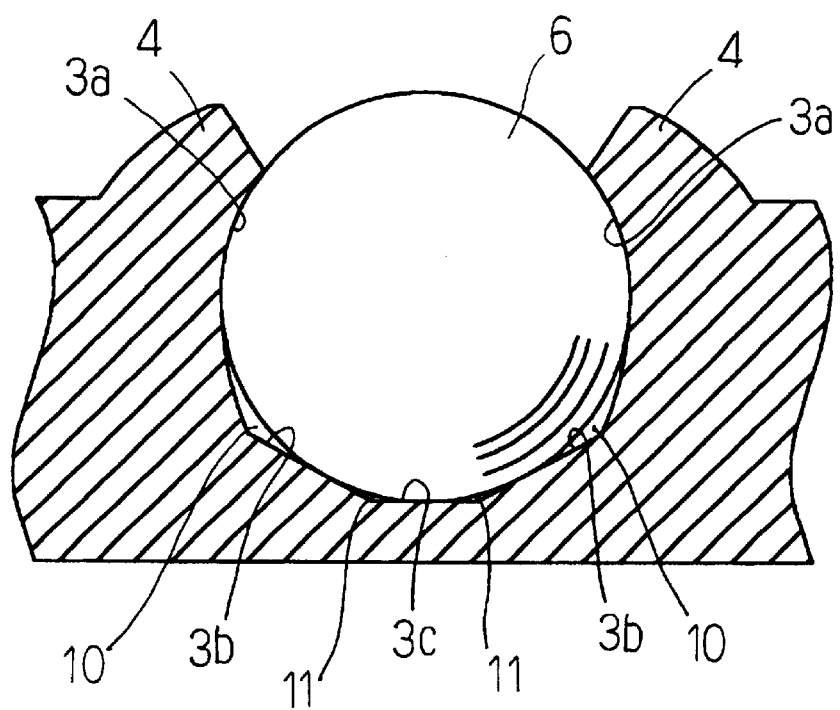
FIG. 3 is a longitudinal cross sectional view showing the pocket portion.
Figure 4:
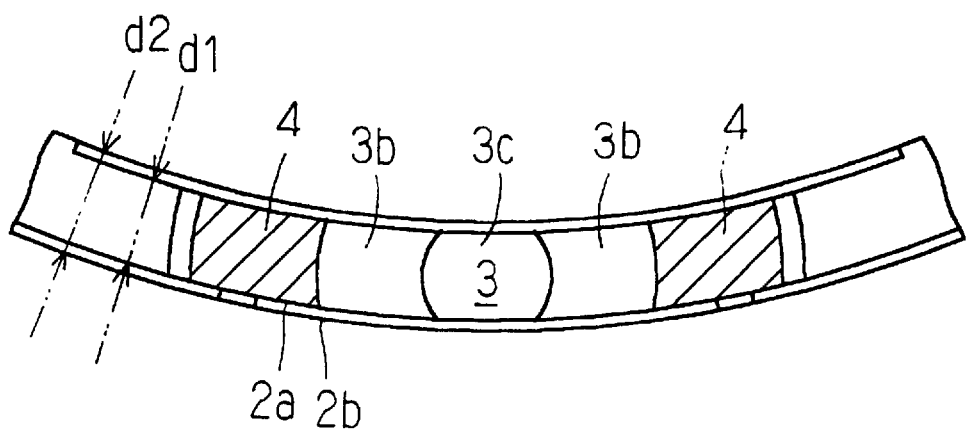
FIG. 4 is a transverse cross sectional view taking along the line IV—IV of FIG. 2.
Figure 5:
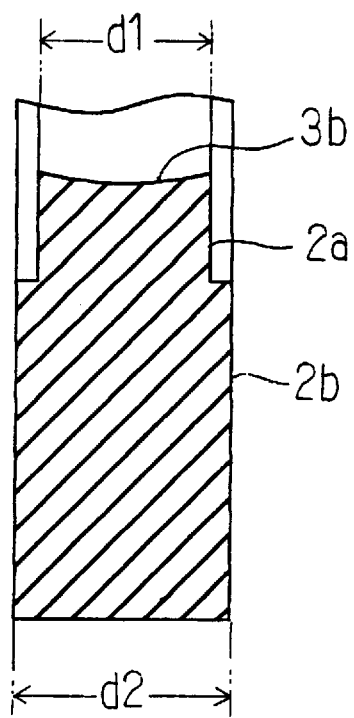
FIG. 5 is a cross sectional view taking along the line V—V of FIG. 2.
Figure 6:
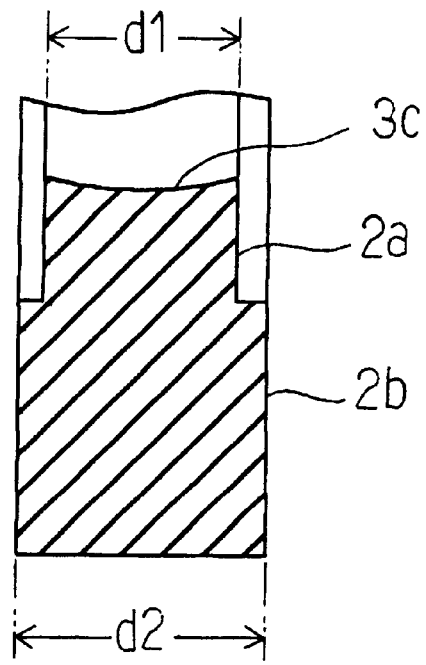
FIG. 6 is a cross sectional view taking along the line VI—VI of FIG. 2.

A plurality of pockets 3, 3, . . . are provided at equal intervals around the body 2. Each pocket has an entrance 5 defined on the one outer peripheral edge (the upper edge in FIGS. 1–3) of the body by a pair of opposite claws 4. Substantially upper left and right halves 3a, 3a are provided following the entrance 5. Each half includes a curved surface following the contour of the spherical surface of the ball 6 in the peripheral direction as well as the width direction (the direction of the thickness of the body) as shown in FIGS. 2 and 3. In other words, the inner peripheral surfaces of the upper halves 3a, 3a are curved surfaces of a radius of curvature slightly larger in both peripheral and width directions than that of the ball to be retained.

The balls can be pushed into the pockets through the deformation of the claws 4. This can be done by the elasticity of the claws 4.

The pocket further includes a pair of right and left lower halves 3b, 3b. Each of these halves includes an inner peripheral surface of a curved shape in the width direction and of a straight shape in the peripheral direction. The peripheral surfaces of the lower halves are descending inwardly toward the junction with the bottom portion of the pocket. Thus the ball to be retained within the pocket will contact in tangential with the peripheral surface.

The inner surface 3c of the bottom portion of the pocket includes a surface of a shape which is curved in the width direction in the same way as those of the upper and lower halves, and of straight shape in the peripheral direction, tangential to the ball to be retained.

Thus, the pocket of the present invention will reduce the contact areas of the lower halves and the bottom portion with the ball to reduce the frictional resistance therebetween. Further, in the pocket of the present invention, substantially triangular shaped lubricant reservoirs 10, 11 are defined between the inner surfaces of the pocket and the outer surface of the ball as shown in FIG. 3, so that feeding of the lubricant can be facilitated.

In accordance with the present invention, the thickness of the body is reduced at the portions 2a around the pockets to d1 on the one hand, and the thickness of the body is enlarged at the portions 2b other than those around the pockets to d2 on the other hand.

Those represented by reference numeral 2c are bridges formed between adjacent pockets of the retainer body. Although the bridge is shown in FIG. 1 not as a thickened portion, the bridge can be thickened to enhance the rigidity of the retainer.

Figure 7:
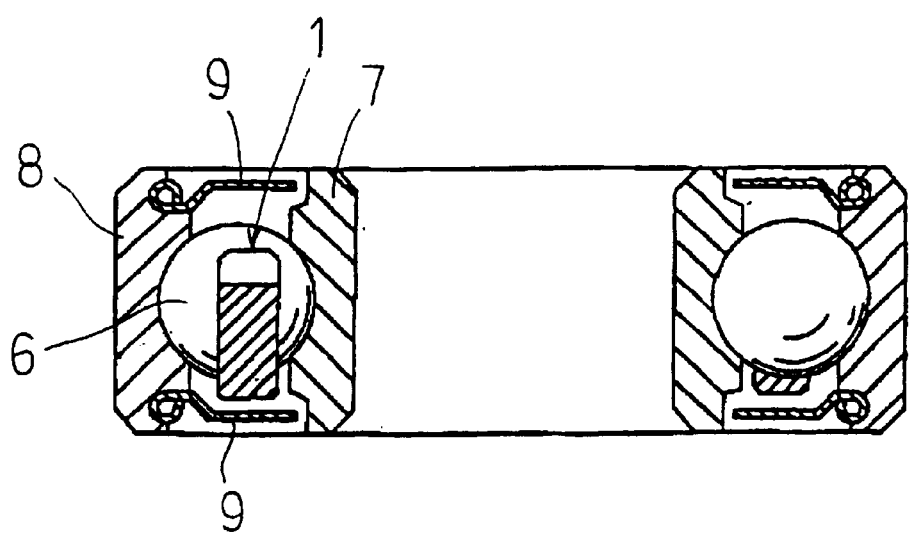
FIG. 7 is a longitudinal cross sectional view showing the ball bearing of the present invention.
Figure 8:
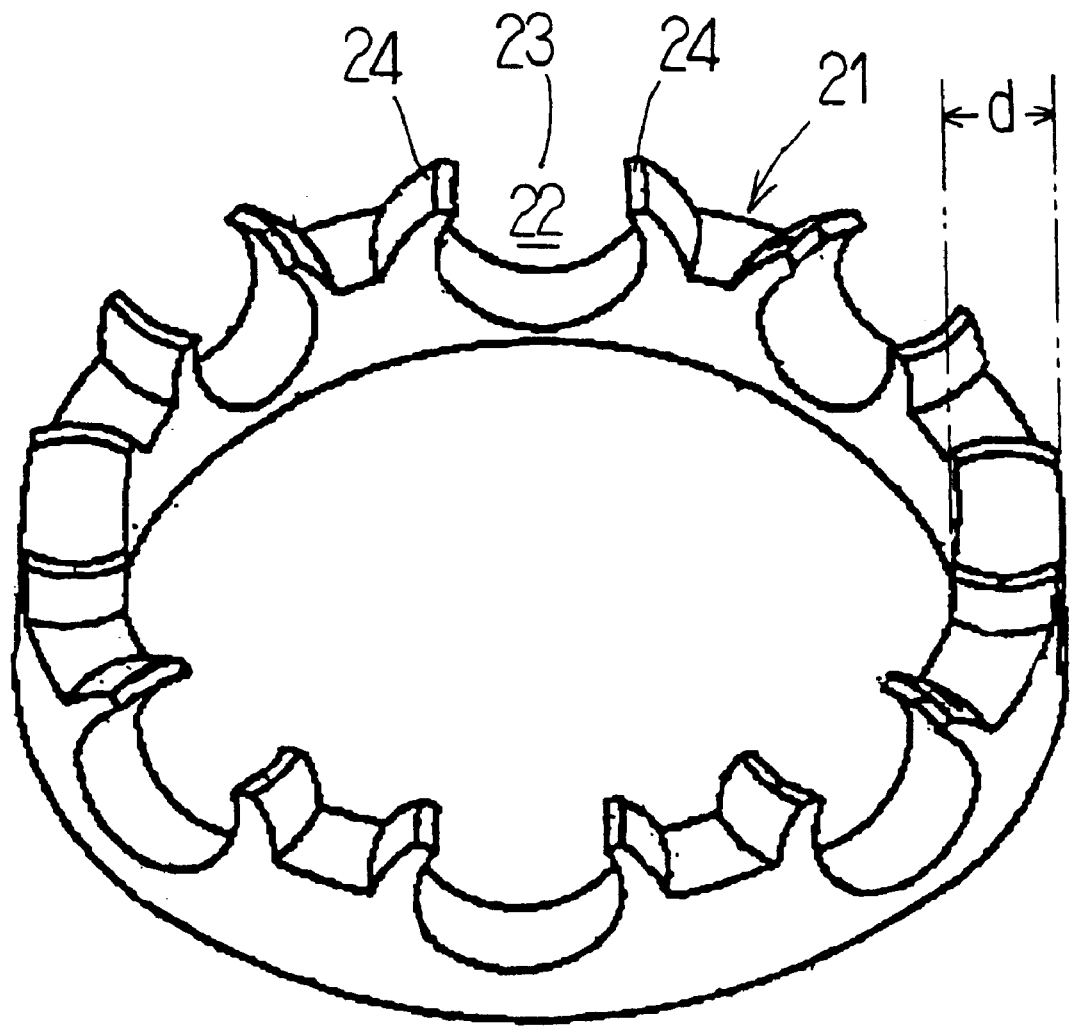
FIG. 8 is a perspective view showing the general structure of the retainer of the prior art.

The retainer of the structure as mentioned above can be used by pushing balls through the entrances 5 into the pockets. The retainer is assembled between an inner ring 7 and an outer ring 8 of the ball bearing, as shown in FIG. 7.

The element represented by the reference numeral 9 is a seal plate.

The effects and advantages to be derived from the present invention will now be described.

The pocket of the retainer includes a pair of upper halves presenting inner peripheral curved surfaces of the radius of curvature slightly larger than that of the ball in both peripheral direction and the width direction. Thus the area of contact with the ball is enlarged. However, a pair of lower halves following the upper halves, and a bottom portion include curved surfaces of the radius of curvature following the contour of the outer surface of the ball in the width direction, but is straight other than curvature in the peripheral direction, so that the ball is adapted to be contacted tangentially to the surface of the lower halves and the bottom portion. Thus the contact area defined between the ball and the lower halves and/or the bottom portion is reduced and the frictional resistance with the ball is also reduced in comparison with the retainers in which all of the peripheral surface of the pocket follows the contour of the outer surface of the ball.

Further, in the pocket of the present invention, substantially triangular shaped lubricant reservoirs 10, 11 are defined between the inner surface of the pocket and the surface of the ball, so that the lubricant can be fed smoothly.

The reduction of the thickness of the retainer body around the pocket to d1 will also contribute to the reduction of the friction of the ball.

Although the reduction of the thickness of the retainer body around the pocket to d1 will cause the anxiety on the strength of the retainer body during the manufacturing process of the retainer, the assembling operation into the ball bearing, and the utilization of the ball bearing, the strength of the retainer body can be maintained by the thickness of the portion of the body of the retainer other than that around the pocket.

As mentioned above, in the retainer of the present invention, since the contact area defined between the pocket and the ball is reduced, and the lubricant can smoothly be fed to the contact area from the lubricant reservoir defined between the inner surface of the pocket and the outer surface of the ball, the ball bearing of the present invention can operate with reduced frictional resistance and without making noises. The ball bearing especially suitable for the rotating portion of the hard disk drive device (HDD) can thus be provided.

While particular embodiments of the present invention have been illustrated and described, it should be obvious to those skilled in the art that various changes and modifications can be made without departing from the spirit and scope of the invention.

What is claimed is:

1. A retainer for a ball bearing including
   an annular retainer body,
   a plurality of pockets for retaining the balls therein disposed around the retainer body, and
   a ball entrance of each pocket defined by a pair of opposite slightly elastic claws formed on one of the outer edges of the retainer body, the retainer being characterized in that
   each pocket includes substantially upper left and right halves following the entrance, a pair of right and left lower halves following the upper halves, and a bottom portion disposed between lower halves, wherein, an inner peripheral surface of each upper half presents a curved surface of the pocket of the radius of curvature slightly larger than that of the ball to be retained therein in both peripheral and width directions, an inner peripheral surface of each lower half descending inwardly toward the junction with the bottom portion of the pocket presents a configuration which has a shape of curved surface in the width direction of the pocket and of a straight shape in the peripheral direction of the pocket so as to contact tangentially with the ball, and an inner surface of the bottom presents a configuration which has a shape of curved surface in the width direction in the same way as those of the upper and lower halves, and is straight shape in the peripheral direction of the pocket so as to contact tangentially with the ball to be retained.

2. The retainer for a ball bearing according to claim 1, characterized in that the thickness of a portion of the retainer around the pocket is reduced, and the thickness of a portion of the retainer other than the portion around the pocket is enlarged.

3. The retainer for a ball bearing according to claim 1, characterized in that said claws have an elasticity sufficient to allow the ball to push them apart to get into the pocket.

4. The retainer for a ball bearing according to claim 1, characterized in that said retainer is made of synthetic resin.

5. The retainer for a ball bearing according to claim 1, characterized in that lubricant reservoirs of substantially triangular configuration are defined between the ball and a junction between the upper and lower half of the pocket, and a junction between the lower half and the bottom portion of the pocket.

6. A ball bearing including a retainer, plurality of balls an inner ring and an outer ring, the retainer comprising;
an annular retainer body,
a plurality of pockets for retaining the ball therein disposed around the retainer body, and
a ball entrance of each pocket defined by a pair of opposite slightly elastic claws formed on one of the outer edges of the retainer body, the retainer being characterized in that each pocket includes substantially upper left and right halves following the entrance, a pair of right and left lower halves following the upper halves, and a bottom portion disposed between lower halves, wherein, an inner peripheral surface of each upper half presents a curved surface of the pocket of the radius of curvature slightly larger than that of the ball to be retained therein in both peripheral and width directions, an inner peripheral surface of each lower half descending inwardly toward the junction with the bottom portion of the pocket presents a configuration which has a shape of curved surface in the width direction of the pocket and of a straight shape in the peripheral direction of the pocket so as to contact tangentially with the ball, an inner surface of the bottom presents a configuration which has a shape of curved surface in the width direction in the same way as those of the upper and lower halves, and is straight shape in the peripheral direction of the pocket so as to contact tangentially with the ball to be retained, and the retainer is assembled between the inner ring and the outer ring and the balls are retained within the pockets.

7. The ball bearing according to claim 6, characterized in that the thickness of a portion of the retainer around the pocket is reduced, and the thickness of a portion of the retainer other than the portion around the pocket is enlarged.

8. The ball bearing according to claim 6, characterized in that said claws have an elasticity sufficient to allow the ball to push them apart to get into the pocket.

9. The ball bearing according to claim 6, characterized in that said retainer is made of synthetic resin.

10. The ball bearing according to claim 6, characterized in that lubricant reservoirs of substantially triangular configuration are defined between the ball and a junction between the upper and lower half of the pocket, and a junction between the lower half and the bottom portion of the pocket of said retainer.

* * * * *